(12) United States Patent
Semersky et al.

(10) Patent No.: US 7,950,295 B2
(45) Date of Patent: May 31, 2011

(54) HANDHELD TORQUE AND LINEAR FORCE METER

(75) Inventors: Frank E. Semersky, Holland, OH (US); Jonathan A. McGurk, Toledo, OH (US); Aaron R. Teitlebaum, Holland, OH (US); Spencer W. Crissman, Toledo, OH (US)

(73) Assignee: Plastic Technologies, Inc., Holland, OH (US)

( * ) Notice: Subject to any disclaimer, the term of this patent is extended or adjusted under 35 U.S.C. 154(b) by 183 days.

(21) Appl. No.: 12/355,374

(22) Filed: Jan. 16, 2009

(65) Prior Publication Data

US 2009/0178492 A1 Jul. 16, 2009

Related U.S. Application Data

(60) Provisional application No. 61/021,397, filed on Jan. 16, 2008.

(51) Int. Cl.
*G01L 5/24* (2006.01)
(52) U.S. Cl. .................................................. 73/862.21
(58) Field of Classification Search ... 73/862.21–862.23
See application file for complete search history.

(56) References Cited

U.S. PATENT DOCUMENTS

| 4,539,852 | A | 9/1985 | Feld |
| 5,903,462 | A * | 5/1999 | Wagner et al. ................ 700/168 |
| 6,910,390 | B2 | 6/2005 | Semersky |
| 7,194,940 | B2 | 3/2007 | Hsieh |
| 7,320,254 | B1 * | 1/2008 | Martin ...................... 73/862.21 |
| 7,380,472 | B2 * | 6/2008 | Hsieh ........................ 73/862.21 |
| 2004/0040727 | A1 | 3/2004 | Miller |
| 2007/0258395 | A1 | 11/2007 | Jollota et al. |

* cited by examiner

*Primary Examiner* — Lisa M Caputo
*Assistant Examiner* — Octavia Davis
(74) *Attorney, Agent, or Firm* — Fraser Clemens Martin & Miller LLC; Michael E. Dockins

(57) ABSTRACT

A handheld torque measuring meter adapted to measure the downward thrust and torsional force required to apply or remove a screw type closure from the threaded neck or finish of an associated container is disclosed, the handheld meter having a first portion graspable a user, a member adapted to receive a portion of a closure of a container, means connecting said main body to said member including a load cell, and a means for displaying a measurement adapted to receive the output signal from the load cell and indicate one of the torsional force and the linear force required to effect a movement of the closure relative to the associated container.

13 Claims, 4 Drawing Sheets

US 7,950,295 B2

HANDHELD TORQUE AND LINEAR FORCE METER

CROSS-REFERENCE TO RELATED APPLICATION

This application claims the benefit of U.S. Provisional Patent Application Ser. No. 61/021,397 filed on Jan. 16, 2008.

FIELD OF THE INVENTION

The present invention relates to torque measuring meters, and more particularly to a handheld meter for measuring the downward thrust and torsional force required to apply or remove a screw type closure from the threaded neck or finish of an associated container.

BACKGROUND OF THE INVENTION

In the manufacture of containers comprising combinations of screw-type closures with associated containers, it often becomes necessary or desirable to determine the degree to which the threaded closure complies with applicable torque specifications. For example, the torque with which a threaded closure is applied must be of a certain magnitude to properly seal the container so the closure does not become loose during shipment. Child resistant safety closures may comprise an internally threaded inner cap, threaded directly to the finish of a container, and an outer cap loosely retractable relative to the inner cap. A user must push the outer cap axially upon the inner cap to cause a ratchet mechanism to effect simultaneous engagement between the outer cap and the inner cap to permit removal of the closure from the container.

During the manufacture of products packaged in containers having threaded closures, the closures may be applied by equipment which must be adjusted from time to time to compensate for normal mechanical or component variations which may affect the required application torque. Typically, periodic monitoring of the containers being produced is conducted. During a particular production run, a completed sample container may be tested to determine the degree of torque required to loosen the threaded closure therefrom. If the torque required to remove the closure from the container is outside an acceptable range, the components of the manufacturing process are examined and may be adjusted or replaced. The time required to remove the sample container from a production line for testing may be significant and result in unacceptable production.

There are known prior art devices and methods for affecting quality control torque tests of threaded closures to determine an amount of torque required to remove the closure from the threaded finish of a container. One of the standards of the industry is known as the Owens-Illinois Torque Meter manufactured by Secure Pak, Inc., Maumee, Ohio. There are also bench top torque measuring devices wherein a container to be tested is placed on the device and manually retained to resist any rotational movement during the testing operation. The torque required to remove the associated closure is then measured. To obtain the desired measurements, the containers must be transported to and from the torque measuring device. The torque applied varies from one operator to another. Consequently, torque data produced is often non-uniform and non-reliable in comparison to industry standards. None of the known torque measuring devices measures the linear force, referred to as the downward thrust, required to move an outer cap of a child resistant closure, axially to cause engagement of an associated ratchet mechanism to rotate the inner cap to remove the closure.

It would be desirable to design a handheld device for determining the removal and/or application torque and the downward linear force on a threaded closure required to remove the closure from a container.

SUMMARY OF THE INVENTION

Concordant and congruous with the present invention, a handheld device for determining the removal and/or application torque and the downward linear force on a threaded closure required to remove the closure from a container has surprisingly been disclosed.

In an embodiment of the invention, the handheld meter for measuring the torque and thrust required to apply or remove a threaded closure from the finish of a container, comprises a main body graspable by a hand of a user; container closure receiving means adapted to receive a portion of a closure of a container; means connecting said main body to said closure receiving means, said means including a load cell, wherein the load cell produces an output signal in response to one of a torsional force on a closure required to cause axial movement between the closure and a threaded finish of a container and a linear force required to apply or remove the closure; and a means for displaying a measurement in electrical communication with the load cell and adapted to receive the output signal therefrom and indicate one of the torsional force and the linear force required to effect a movement of the closure relative to the container.

In another embodiment of the invention, the handheld meter for measuring the torque and thrust required to apply or remove a threaded closure from the finish of a container, comprises a main body graspable by the hand of a user; a member having a cavity formed therein and adapted to receive a portion of a closure of a container; means connecting said main body to said member, said means including a load cell, wherein the load cell produces an output signal in response to one of a torsional force on a closure required to cause axial movement between the closure and the container and a linear force required to apply or remove the closure; and a means for displaying a measurement in electrical communication with the load cell and adapted to receive the output signal therefrom and indicate one of the torsional force and the linear force required to effect a movement of the closure relative to the container.

In another embodiment of the invention, the handheld meter for measuring the torque and thrust required to apply or remove a threaded closure from the finish of a container, comprises a main body graspable by the hand of a user; a member having a threaded finish adapted to receive a closure for a container; means connecting said main body to said member, said means including a load cell, wherein the load cell produces an output signal in response to one of a torsional force on the closure required to cause axial movement between the closure and the threaded finish and a linear force required to apply or remove the closure; and a means for displaying a measurement in electrical communication with the load cell and adapted to receive the output signal therefrom and indicate one of the torsional force and the linear force required to effect a movement of the closure relative to the threaded finish.

BRIEF DESCRIPTION OF THE DRAWINGS

The above, as well as other objects and advantages of the invention will become readily apparent to one skilled in the art from reading the following detailed description of an embodiment of the invention when considered in the light of the attached drawings, in which.

DETAILED DESCRIPTION OF THE PREFERRED EMBODIMENT

As illustrated in FIGS. 1 through 6, there is shown an improved handheld meter 10 for sensing and displaying the torque required to apply or remove a screw type closure from the threaded neck or finish of an associated container. The handheld meter 10 is adapted to sense and display the linear force required to move an outer closure member axially into engagement with the ratchet mechanism of an associated inner member to enable the inner closure to open a child resistant closure to remove the closure from the threaded neck or finish of a container.

Figure 1:
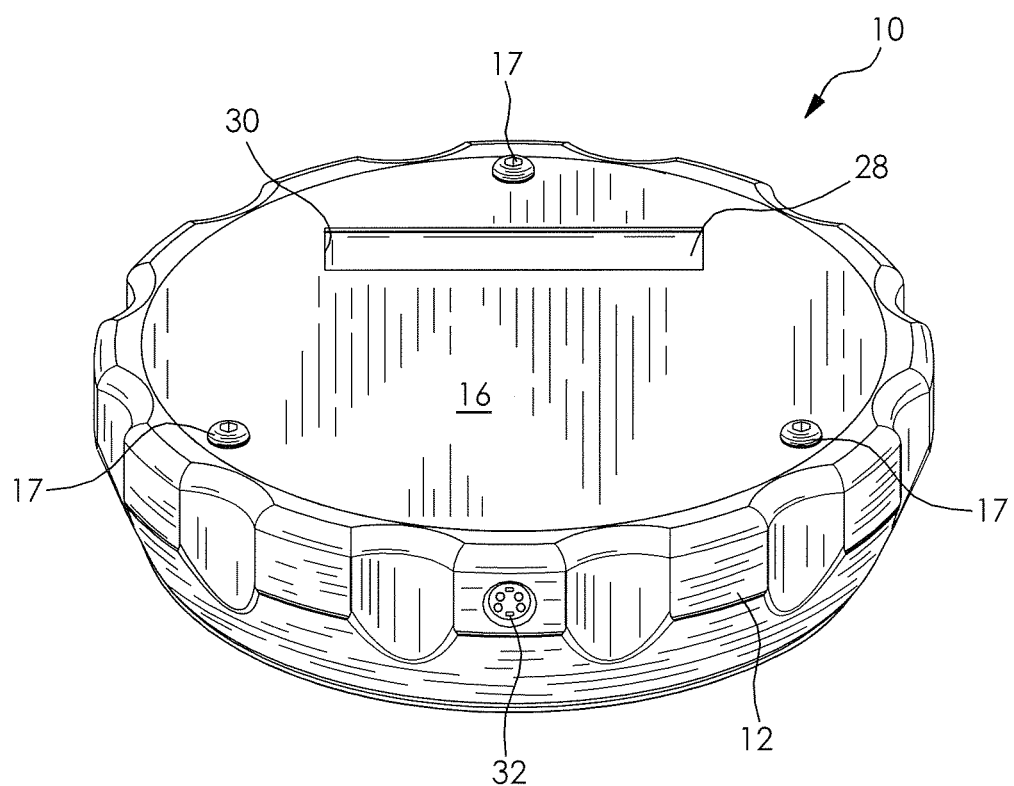
FIG. 1 is a perspective view of a handheld meter incorporating the features of the present invention.
Figure 2:
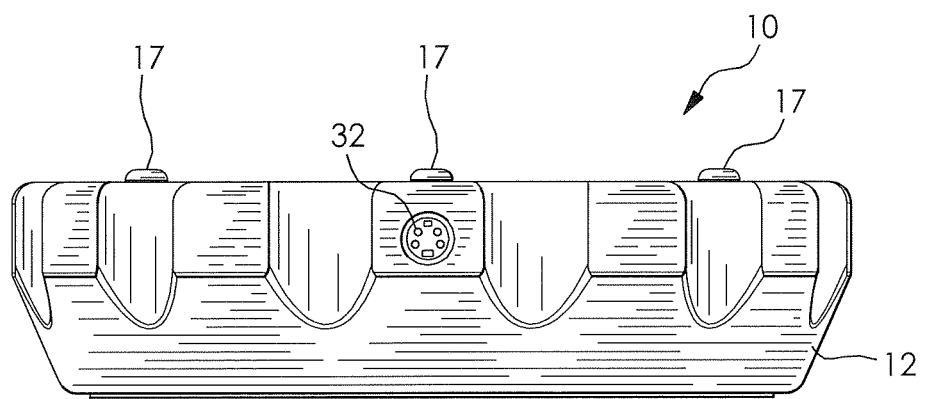
FIG. 2 is a front elevational view of the handheld meter of FIG. 1.
Figure 3:
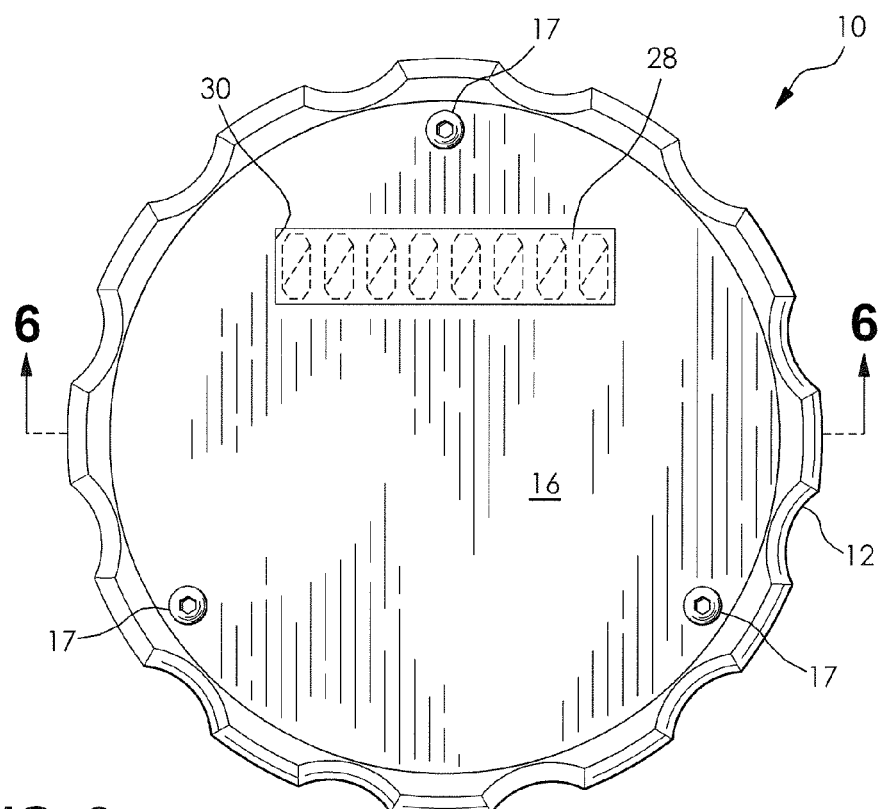
FIG. 3 is a top plan view of the meter illustrated in FIGS. 1 and 2.
Figure 4:
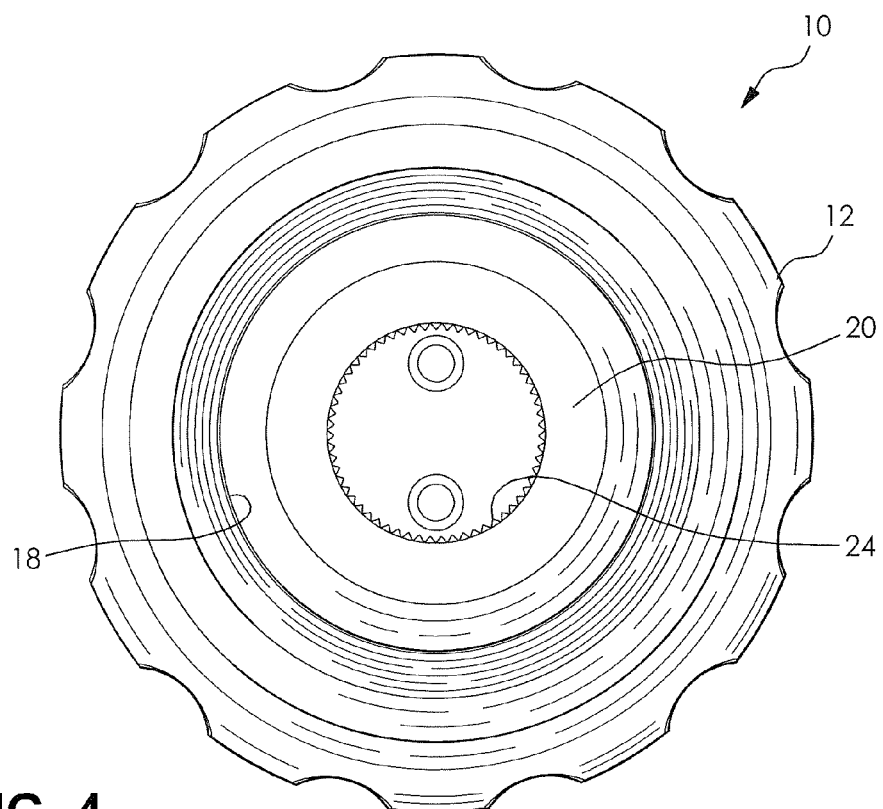
FIG. 4 is a bottom plan view of the meter illustrated in FIGS. 1 and 2.
Figure 5:
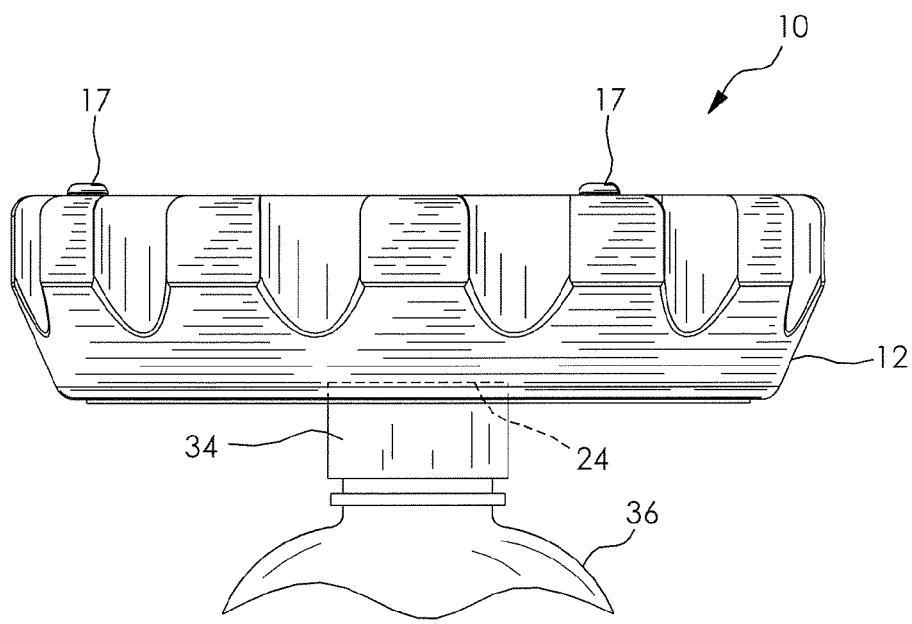
FIG. 5 is a side elevational view of the meter of FIG. 1 with a container closure partially disposed therein.
Figure 6:
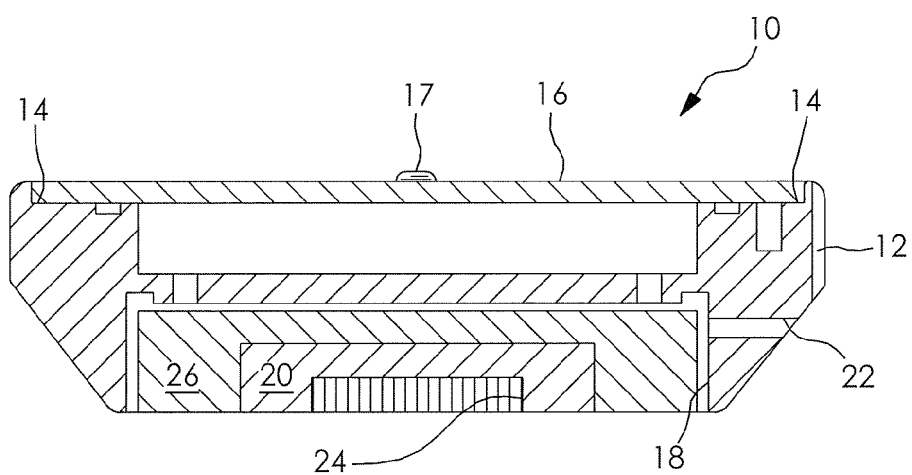
FIG. 6 is a cross-sectional view of the meter of FIG. 3 taken along line 6-6 thereof.

The meter 10 is comprised of a main annular body 12 having a shoulder 14 formed at the upper most peripheral edge thereof. The shoulder 14 is adapted to receive the outer circumferential edge of an upper cover plate 16 and secured thereto by suitable spaced threaded fasteners 17. The opposite or lower portion of the main body 12 is provided with an annular opening 18. The opening 18 is adapted to accept a load cell 26 which is adapted to receive a closure receiving chuck member 20. The member 20 is typically fixed to the load cell 26 with suitable fasteners to militate against any relative movement therebetween. The member 20 may be fixed to the load cell 26 with an adhesive or by frictional engagement therewith. The member 20 is provided with a centrally disposed cavity 24 having an annular array of inwardly projecting ribs corresponding in number and configuration to the outwardly extending ribs of a closure member to be tested. Now it will be understood that the cavity 24 functions as a chuck or clamping device for militating against any relative movement between the meter 10 and the closure being tested as will become readily apparent hereinafter. The cavity 24 may include an elastomeric material adapted to frictionally engage a closure disposed therein. The load cell 26 is mounted between the inner surface of the cover plate 16 and the chuck member 20. The load cell 26 is fixed to the main body 12 with a fastener (not shown) disposed through apertures 22 formed in the main body 12. The fastener attaches the main body 12 to the load cell 26 in a manner to facilitate torsional and linear thrust forces on the load cell 26, as best illustrated in FIG. 6. The load cell 26 is typically electrically coupled to a power supply such as a battery, not shown. The battery is adapted to be housed within the interior of the main body 12. A readout device 28 of the load cell 26 is mounted or displayed through a window 30 formed in the cover plate 16, as illustrated in FIGS. 1 and 3. Load cell 26 may be of a type illustrated and described in U.S. Pat. No. 4,669,319.

The meter 10 also includes a data port 32 in electrical communication with the load cell 26 and a memory storage device (not shown) as known in the art. The main body 12 of the meter 10 contains both the data port 32 and a memory storage device. It is understood that the data port 32 may be any interface adapted to be linked to a computer or other external data storage device. The data port 32 may be a USB port, a parallel port, a wireless transmitter, an infrared transmitter, and the like, for example.

The load cell 26 typically includes a beam element directly connected to the member 20. As the beam element of the load cell 26 is caused to be torqued about the central axis thereof, a measurement of the torsional effect may be observed on the associated readout device 28. As a linear force or downward thrust is exerted on the beam element of the load cell 26, a measurement of the linear force effect may be observed on the associated readout device 28.

In operation, the cavity 24 of the meter 10 is positioned over the closure 34 of an associated container 36, the base of which may be secured to prevent any rotational movement thereof. The closure 34 is secured in a closed relation on the finish of the container 36. The wall that defines the cavity 24 is caused to tightly engage the closure 34. Next, an operator rotates the main body 12 by grasping the outer edge portion thereof and twisting the main body 12, thereby applying a torque to the load cell 26. Simultaneously, the operator presses down on the meter 10, thereby applying a downward linear force to the main body 12 through the load cell 26. The twisting movement of the main body 12 is counter-clockwise, tending to loosen the closure 34 from the threaded neck of the container 36. The readout device 28 will display the amount of torque required to loosen the closure 34 and the amount of linear force applied to the closure 34 required to push an outer cap axially onto an inner cap to engage a ratchet mechanism to be able to simultaneously torque and turn the inner cap, if the closure 34 is a child resistant closure.

The reverse movement of the main body 12 of the meter 10 upon the closure 34 which is to be applied to the container 36 will determine the torque necessary to tighten the closure 34. This operation is accomplished by twisting the main body 12 of the meter 10 in a clockwise direction. If the closure 34 is a child resistant closure, the main body 12 of the meter 10 may be pressed downward while twisted in a clockwise direction to determine the linear force necessary to tighten the closure 34. Once the meter 10 has been used, an electrical cable may be attached to a computer and the meter 10 to transfer information related to measured amounts of torque and linear force from the memory device of the meter 10 to the computer. The information may then be further analyzed at the computer while the meter 10 is used for continued testing.

Figure 7:
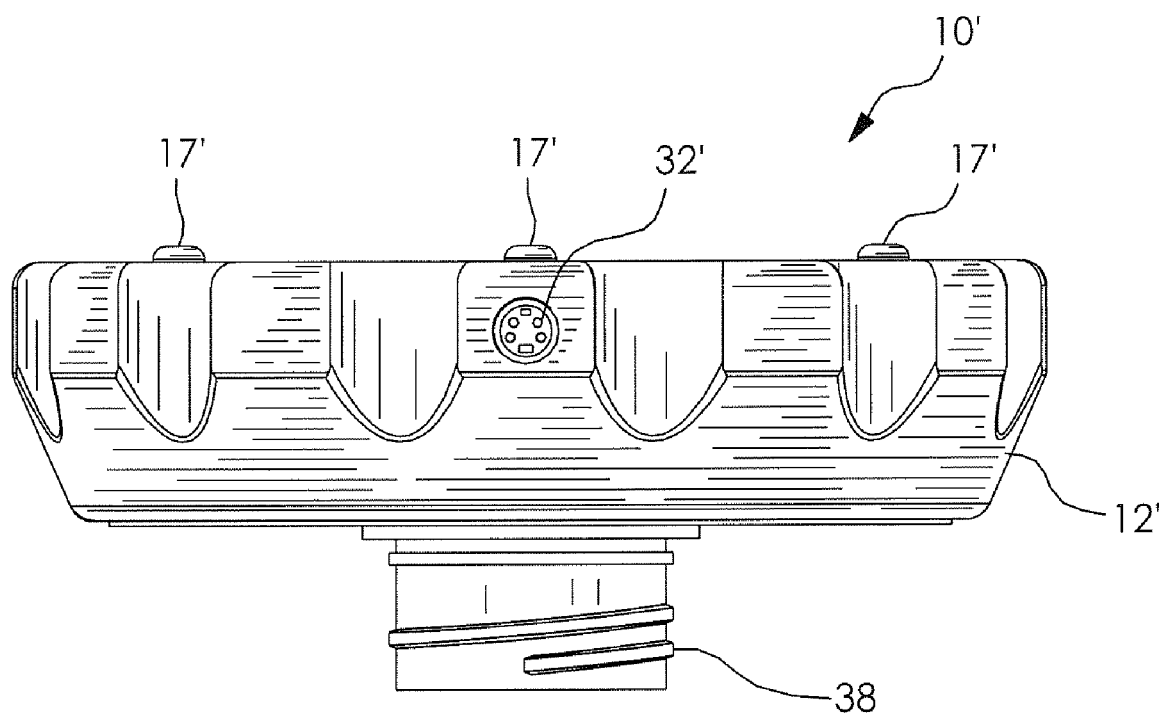
FIG. 7 is a side elevational view of another embodiment of the handheld torque meter.

As illustrated in FIG. 7, there is shown an alternative handheld meter for sensing and displaying the torque required to apply or remove a screw type closure cap from the threaded neck or finish of an associated container. Prime reference numerals are employed to indicate similar elements of the embodiment illustrated in FIGS. 1-6, inclusive. A meter 10' is illustrated and comprises main body 12' which includes a threaded finish 38 similar to the threaded finish 38 of a container. It is understood that the threaded finish 38 may have any size, shape, and number of threads as desired. It is also understood that the threaded finish 38 may be removable, and a different threaded finish or other tool may be disposed in the meter 10'. A load cell or at least one strain gage, similar to the load cell 26 shown in FIG. 6. A typical example of a suitable coil spring or other torsional spring, a spring loaded moment arm, or strain gages is disclosed in U.S. Pat. No. 4,669,319 to Heyraud. It is understood that a direct readout device, such as a digital display, may be incorporated as a portion of the meter 10'. The meter 10' contains the required electrical components including the digital display, if used, and a power supply, not shown. The power supply may be a battery disposed in the meter 10'. The electronic components convert the output signal of the load cell into an appropriate measurement, which is consequently indicated on the display preferably located in the meter 10'.

The meter 10' also includes a data port 32' in communication with the load cell and a memory storage device. It is understood that the data port may be any interface adapted to be linked to a computer or other external data storage device. The data port may be a USB port, a parallel port, a wireless transmitter, an infrared transmitter, and the like, for example. The memory storage device may be any standard electronic memory storage device. The load cell includes a beam element directly connected to the main body 12'. As the beam element of the load cell is caused to be torqued about the central axis thereof, the torsional effect may be observed on the associated display.

In operation, the meter 10' is positioned under a capping machine for applying a closure on a container. The meter 10' may be secured to prevent any rotational movement thereof. A closure is secured in a closed relation on the threaded finish 38 of the lower section 12'. The closure from the capping machine is caused to tightly engage the finish 38, thereby applying a torque to the load cell through the lower section 12'. The digital display will register the amount of torque applied by the capping machine to tighten to the closure on the finish 38 to determine whether the capping machine is applying closures to containers within desired torque specifications. If the capping machine is operating outside of the desired specifications, an operator may adjust the capping machine accordingly without having to disable the capping machine or remove containers having a closure from an assembly line to be tested with the meter 10'.

Once the meter 10' has been used and the capping machine has been adjusted to operate within the desired specifications, a cable may be attached to a computer and to the meter 10' to transfer information related to measured amounts of torque from the meter 10' to the computer. The information may then be further analyzed at the computer while the meter 10' is used for continued testing.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A handheld meter for measuring the torque and thrust required to apply or remove a threaded closure from the finish of a container, comprising:
    a main body graspable by a hand of a user;
    container closure receiving means adapted to receive a portion of a closure of a container;
    means connecting said main body to said closure receiving means, said means including a load cell, wherein the load cell produces an output signal in response to a torsional force on a closure required to cause axial movement between the closure and a threaded finish of a container and a linear force required to apply or remove the closure; and
    a means for displaying a measurement in electrical communication with the load cell and adapted to receive the output signal therefrom and indicate the torsional force and the linear force required to effect a movement of the closure relative to the container.

2. The handheld meter of claim 1, wherein the container closure receiving means includes a cavity adapted to receive and engage the portion of the closure.

3. A handheld meter of claim 2, wherein the cavity is adapted to receive a chuck member adapted to engage the portion of the closure.

4. The handheld meter of claim 1, further including a memory storage device in electrical communication with the load cell.

5. The handheld meter of claim 4, further including a data port adapted to link with a computer in electrical communication with one of the load cell and the memory storage device.

6. The handheld meter of claim 5, wherein said data port is one of a USB port, a parallel port, a wireless transmitter, and an infrared transmitter.

7. A handheld meter for measuring the torque and thrust required to apply or remove a threaded closure from the finish of a container, comprising:
    a main body graspable by the hand of a user;
    a member having a cavity formed therein and adapted to receive a portion of a closure of a container;
    means connecting said main body to said member, said means including a load cell, wherein the load cell produces an output signal in response to a torsional force on a closure required to cause axial movement between the closure and the container and a linear force required to apply or remove the closure; and
    a means for displaying a measurement in electrical communication with the load cell and adapted to receive the output signal therefrom and indicate the torsional force and the linear force required to effect a movement of the closure relative to the container.

8. The handheld meter of claim 7, wherein the cavity includes an elastomeric material adapted to frictionally engage the portion of the closure.

9. The handheld meter of claim 7, further including a memory storage device in electrical communication with the load cell.

10. The handheld meter of claim 9, further including a data port adapted to link with a computer in electrical communication with one of the load cell and said memory storage device.

11. The handheld meter of claim 10, wherein said data port is one of a USB port, a parallel port, a wireless transmitter, and an infrared transmitter.

12. A handheld meter for measuring the torque and thrust required to apply or remove a threaded closure from the finish of a container, comprising:
    a main body graspable by the hand of a user;
    a threaded finish similar to the threaded finish of a container adapted to receive a closure for a container;
    means connecting said main body to said member, said means including a load cell, wherein the load cell produces an output signal in response to a torsional force on the closure required to cause axial movement between the closure and the threaded finish and a linear force required to apply or remove the closure; and
    a means for displaying a measurement in electrical communication with the load cell and adapted to receive the output signal therefrom and indicate the torsional force and the linear force required to effect a movement of the closure relative to the threaded finish.

13. The handheld meter of claim 12, wherein the threaded finish is removable from said member.

* * * * *